United States Patent
Cullen

[11] Patent Number: 5,463,849
[45] Date of Patent: * Nov. 7, 1995

[54] AGRICULTURAL FEED BAGGING MACHINE

[75] Inventor: Steven R. Cullen, Astoria, Oreg.

[73] Assignee: Versa Corporation, Astoria, Oreg.

[*] Notice: The portion of the term of this patent subsequent to Mar. 29, 2011, has been disclaimed.

[21] Appl. No.: 200,756

[22] Filed: Feb. 23, 1994

Related U.S. Application Data

[63] Continuation-in-part of Ser. No. 3,540, Jan. 13, 1993, Pat. No. 5,297,377, which is a continuation-in-part of Ser. No. 912,873, Jul. 13, 1992.

[51] Int. Cl.$^6$ ..................................................... B65B 1/24
[52] U.S. Cl. ..................... 53/527; 53/255; 53/529; 53/567; 53/576; 100/100; 100/144; 141/339
[58] Field of Search ........................... 141/71, 74, 114, 141/286, 317, 339; 100/65, 66, 67, 100, 144, 212; 53/255, 257, 260, 527, 529, 530, 551, 567, 576

[56] References Cited

U.S. PATENT DOCUMENTS

| | | | |
|---|---|---|---|
| 1,662,147 | 3/1928 | Farden | 141/339 |
| 2,174,228 | 9/1939 | Perkins | 141/339 |
| 2,250,910 | 7/1941 | Hiett | 141/339 |
| 3,621,775 | 11/1971 | Dedio et al. | 53/530 X |
| 3,791,593 | 2/1974 | Griffin | 239/667 |
| 3,815,323 | 6/1974 | Longo | 53/530 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,572,064 | 2/1986 | Burton | 100/212 X |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,788,901 | 12/1988 | Klinner et al. | 100/100 X |
| 4,792,031 | 12/1989 | Warner et al. | 141/339 X |
| 4,945,715 | 8/1990 | Brodrecht | 53/567 |
| 4,949,633 | 8/1990 | Johnson et al. | 100/65 |
| 5,009,062 | 4/1991 | Urich et al. | 100/100 X |
| 5,159,877 | 11/1992 | Inman et al. | 100/144 |
| 5,269,829 | 12/1993 | Meyer | 71/9 |
| 5,295,554 | 3/1994 | Cullen | 180/236 |
| 5,297,377 | 3/1994 | Cullen | 53/567 X |

*Primary Examiner*—Lowell A. Larson
*Assistant Examiner*—Daniel Moon
*Attorney, Agent, or Firm*—Zarley, McKee, Thomte Voorhees & Sease; Dennis L. Thomte

[57] ABSTRACT

An improved agricultural feed bagging machine for bagging feed materials in a bag including a rearwardly extending tunnel having elongated and arcuate spaced-apart ridges provided on the inside surfaces of the side walls of the tunnel to create turbulence in the flow of feed, thereby resulting in a greater compaction of the feedstuffs in the bag.

1 Claim, 2 Drawing Sheets

AGRICULTURAL FEED BAGGING MACHINE

CROSS-REFERENCE TO RELATED APPLICATIONS

This is a continuation-in-part application of Ser. No. 08/003,540 filed Jan. 13, 1993, U.S. Pat. No. 5,297,377 which is a continuation-in-part application of application Ser. No. 07/912,873 filed Jul. 13, 1992.

BACKGROUND OF THE INVENTION

1. Field of the Invention

This invention relates to an agricultural feed bagging machine and more particularly to an agricultural feed bagging machine having means on the inside surfaces of the tunnel to create turbulence in the flow of material passing thereby to increase the compaction of the feedstuffs in the agricultural bag.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filing of an individual bag. A further disadvantage of the cable drum and backstop structure of the machine such as disposed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's co-pending application, Ser. No. 07/912,873, a bagging machine is described which has the capability of enabling the density of the silage material to be selectively controlled without the need of an elaborate braking system. Although the bagging machine of Ser. No. 07/912,873 does satisfactorily achieve all of its objectives, a more simple way of controlling the density of the bagged material was discovered and was the subject of the patent application, Ser. No. 08/003,540. Although the density control means described in Ser. No. 08/003,540 did represent a significant advance in the art, it is believed that the instant invention likewise represents a significant advance over the prior art.

In the co-pending application, Ser. No. 08/003,540, a density control means was described which included a plurality of cables which were positioned in the flow of the silage material being bagged. In order to vary the density of the material in Ser. No. 08/003,540, more or less cables would be employed based on the material being packed. For example, corn silage flows easy and would require more cables while alfalfa packs hard and would use less cables. The need to have an on-the-spot variable cable density has existed and the instant invention provides such a feature.

Although the density control means of the co-pending applications do perform extremely satisfactorily, it has been found that the compaction of the feedstuffs within the agricultural bag can be enhanced through the utilization of a plurality of spaced-apart ridges located on the inside surfaces of the side walls of the tunnel.

SUMMARY OF THE INVENTION

An agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A hopper is provided on the wheeled frame for receiving the silage material and is adapted to supply the same to a rotatable rotor which forces the silage into the tunnel and into the bag. At least one U-shaped cable is positioned in the tunnel for controlling the density of the material being compacted within the bag.

In the instant application, a plurality of spaced-apart ridges are provided on the inside surfaces of the side walls of the tunnel. The feed is forced outwardly towards the side walls of the tunnel by the density control cable or cables with the tunnel ridges creating a turbulence in the flow of feed thereby resulting in a tighter compaction of feedstuffs within the bag.

It is therefore a principal object of the invention to provide an improved agricultural bagging machine.

A further object of the invention is to provide an agricultural bagging machine including means for increasing the compaction of feedstuffs within the agricultural bag.

Yet another object of the invention is to provide an agricultural bagging machine having a plurality of spaced-apart tunnel ridges secured to the inside surfaces of the side walls of the tunnel.

These and other objects of the invention will be apparent to those skilled in the art.

DESCRIPTION OF THE PREFERRED EMBODIMENT

Figure 1:
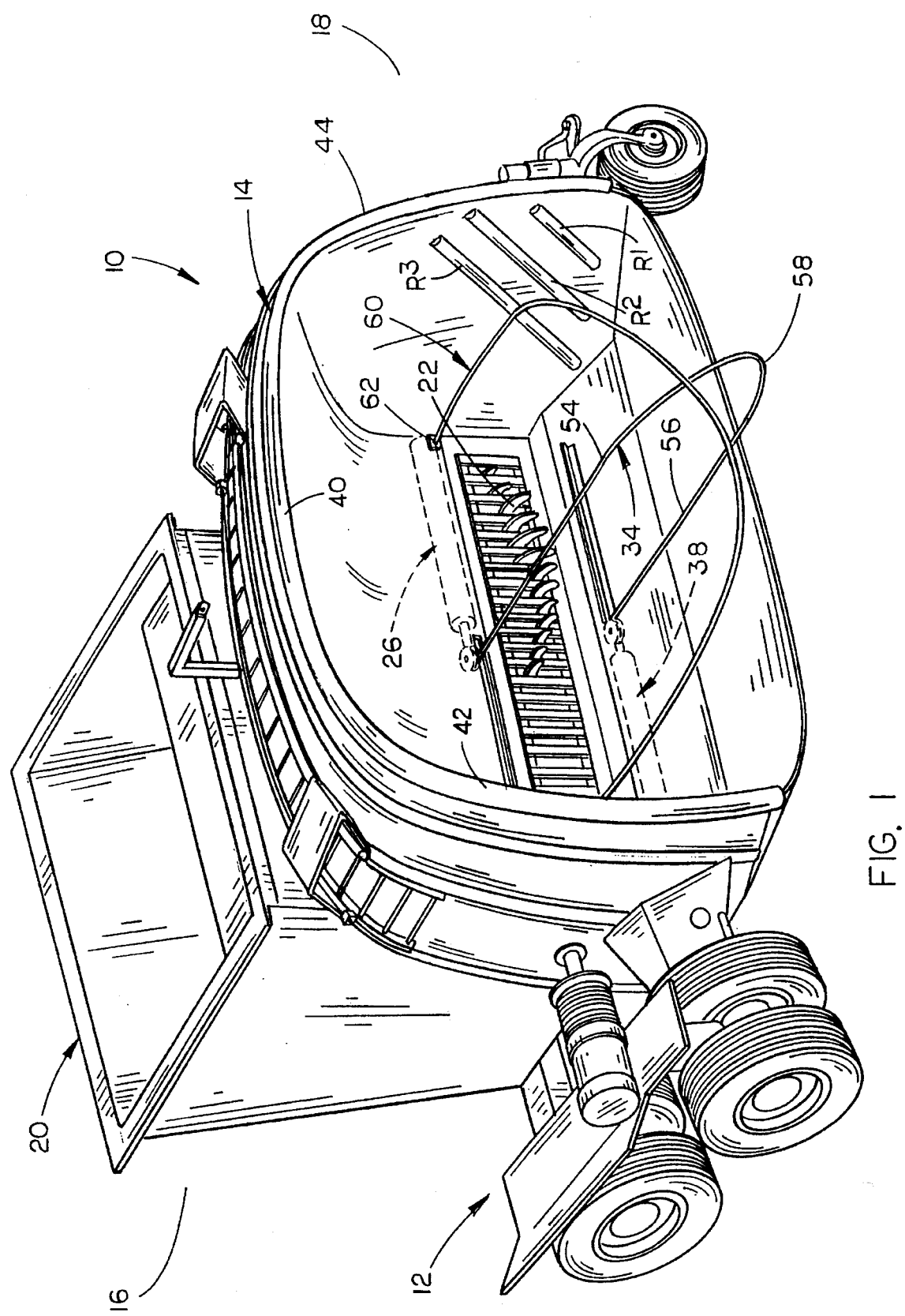
FIG. 1 is a rear perspective view of the bagging machine of this invention.
Figure 2:
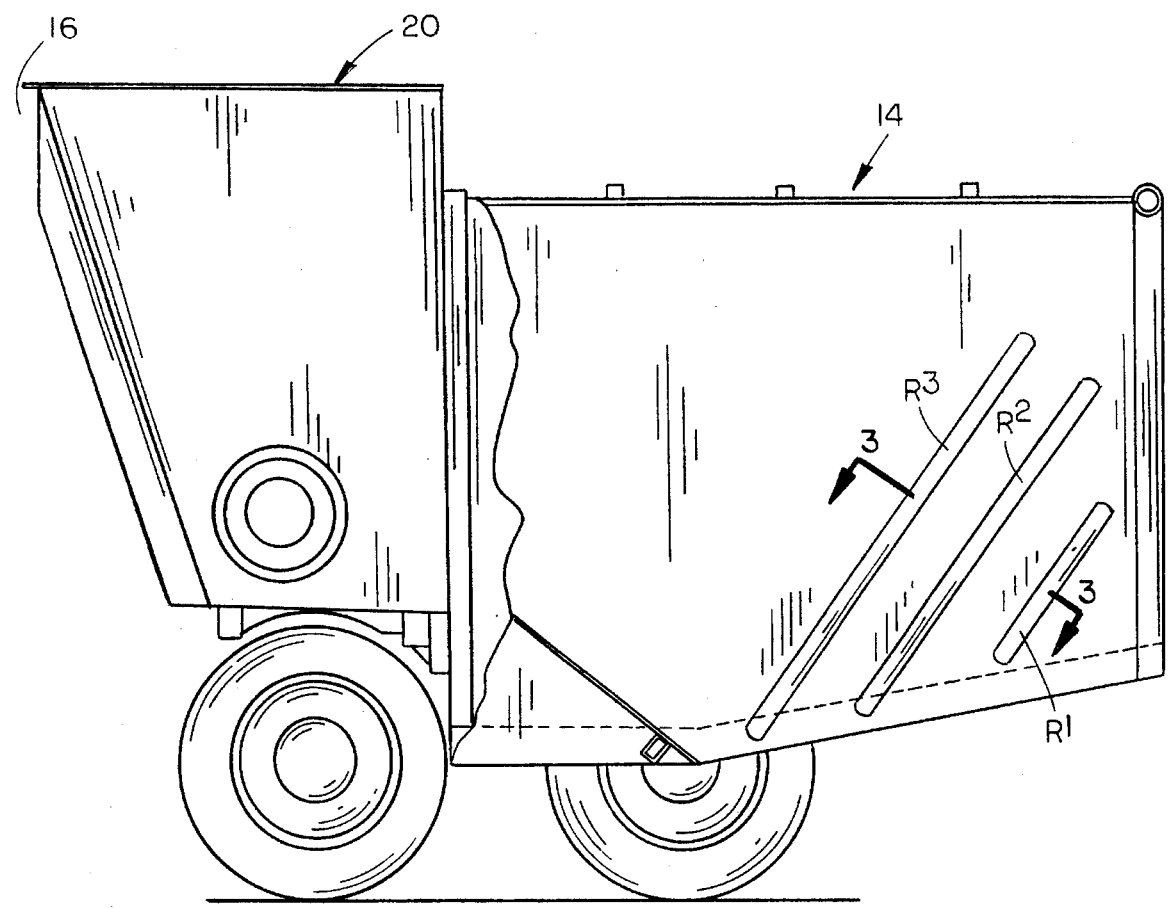
FIG. 2 is a side view of the bagging machine of this invention with a portion of the tunnel cut away to more fully illustrate the invention.

The numeral 10 refers to an agricultural bagging machine which is substantially conventional in design except for the density control means positioned within the tunnel as will be described hereinafter.

Machine 10 includes a wheeled frame means 12 having a tunnel 14 mounted thereon upon which is normally positioned the open mouth of a conventional agricultural bag. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is located at the lower end of the hopper means 20 for forcing the materials to be bagged into the tunnel 14 and into the bag B in conventional fashion.

A density control means 34 may also be provided in the tunnel 14 is so desired. Although FIG. 1 illustrates a pair of density control cables being utilized, a single density control cable will normally suffice in most situations wherein the turbulence creating ridges are utilized as will be described hereinafter.

In FIG. 1, hydraulic cylinders 26 and 38 are operatively connected to density control cable 34 having cable portions 54, 56 and 58. Density control cable 60 is also provided and has its ends suitably anchored such as indicated at 62.

For purposes of description, tunnel 14 will be described as including a top portion 40 and opposite side walls 42 and 44. The inside surfaces of side walls 42 and 44 are each provided with a plurality of spaced-apart ridges R1, R2 and R3 which are in the shape of elongated, arcuate semi-circular members. As seen in FIG. 1, each of the ridges R1, R2 and R3 extend upwardly and rearwardly from their lower ends towards their upper ends. As also seen in FIG. 1, the ridges R1, R2 and R3 progressively decrease in length from the forward end of the tunnel to the rearward end of the tunnel. At least one density control cable is provided within the tunnel 14 as previously described. One type of density control cable is described in my co-pending application, Ser. No. 07/912,873, filed Jul. 13, 1992.

Figure 3:
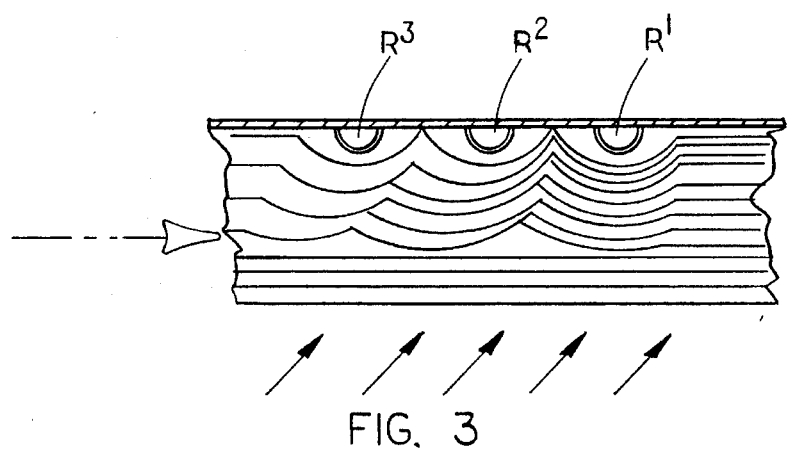
FIG. 3 is an enlarged sectional view seen on lines 3—3 of FIG. 2.

As the feed flows through the tunnel, the density control cable or cables force the feed outwardly towards the side walls of the tunnel and towards the spaced-apart ridges R1, R2 and R3 located on each of the side walls of the tunnel. The ridges create a back force on the flow of feed as illustrated by the arrows in FIG. 3 to increase the compaction of the feedstuffs in the bag. As stated, the ridges increase the compaction of the feedstuffs within the bag due to the fact that they create turbulence in the flow of feed thereby. Although the ridges R 1, R2 and R3, which are located on both of the inside surfaces of the side walls of the tunnels, do work well by themselves, it is preferred that the ridges be used in combination with a density control means such as disclosed in the co-pending applications.

Thus, it can be seen that the invention accomplishes at least all of its stated objectives.

I claim:

1. An agricultural bagging machine for bagging agricultural material into agricultural bags having a closed end and an open mouth comprising, a frame means having rearward and forward ends;

a tunnel on said frame means and having an intake end for receiving the material to be bagged and an output end adapted to receive the open mouth of the agricultural bag;

said tunnel having a top wall and opposite side walls;

a hopper means on said frame means forwardly of said tunnel for receiving the material to be bagged;

a means at the intake end of said tunnel for forcing the material to be bagged from said hopper means into said tunnel and to flow therethrough and into said bag whereby the material will be compacted within said bag;

said tunnel side walls having inside and outside surfaces;

turbulence creating members on the inside surfaces of both of said tunnel side walls for creating turbulence in the flow of material passing through said tunnel thereby causing an increase in the compaction of the material within the agricultural bag;

said turbulence creating members comprising a plurality of spaced-apart, elongated ridges provided on the inside surface of each of said tunnel side walls;

and at least one U-shaped density control cable member positioned in said tunnel.

\* \* \* \* \*